H. HILL.
HORSE COLLAR.
APPLICATION FILED FEB. 24, 1912.
1,054,546.
Patented Feb. 25, 1913.
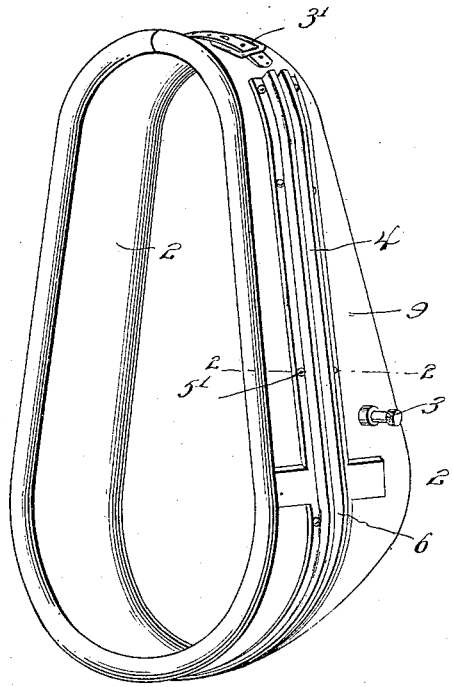
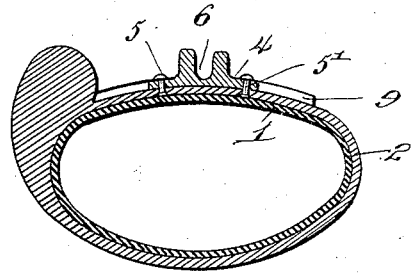
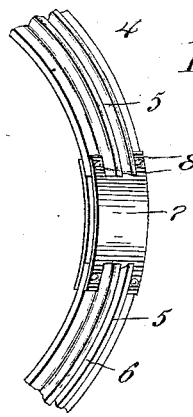
Witnesses
W. S. McDowell
John J. McCarthy
Inventor
Henry Hill
By Victor J. Evans
Attorney
COLUMBIA PLANOGRAPH CO., WASHINGTON, D. C.

UNITED STATES PATENT OFFICE.

HENRY HILL, OF PHOENIX, ARIZONA.

HORSE-COLLAR.

1,054,546. Specification of Letters Patent. Patented Feb. 25, 1913.

Application filed February 24, 1912. Serial No. 679,587.

*To all whom it may concern:*

Be it known that I, HENRY HILL, a citizen of the United States of America, residing at Phoenix, in the county of Maricopa and State of Arizona, have invented new and useful Improvements in Horse-Collars, of which the following is a specification.

The present invention relates to improvements in horse collars and has particular application to horse collars of the pneumatic type.

In carrying out the present invention, it is my purpose to provide a collar of this character, wherein means are employed to facilitate the application of the hames to the collar without mutilating the latter. Furthermore, I aim to provide a collar of this class which shall include a hame receiving plate constructed in such a manner as to readily yield in the application of the collar to the neck of an animal and in the removal of such collar from the animal's neck, the hame receiving plate being equipped with wear plates designed to embrace the collar and prevent damaging of the latter by the trace tugs.

With the above and other objects in view which shall appear as the description progresses, the invention consists in the construction, combination and arrangement of parts hereinafter set forth in and falling within the scope of the appended claims.

In the accompanying drawing forming a part of this specification and wherein has been illustrated what I now consider to be the preferred embodiment of the invention; Figure 1 is a perspective view of a horse collar constructed in accordance with the present invention. Fig. 2 is a horizontal sectional view of the same, and Fig. 3 is a detail perspective view of the hame receiving plate detached from the collar.

Similar reference characters designate like parts throughout the several views.

Referring to the accompanying drawing in detail, the collar, in the present embodiment of the invention includes an inner tube 1 and a thickened outer tube or casing 2, the former being provided with an air valve 3 projecting through the outer casing and adapted for connection with a suitable air pump (not shown) or the like to permit of the tubes being expanded under air pressure. The collar as shown is open at its upper end to facilitate the application of the same to the neck of an animal and the removal of the collar therefrom and this end of the collar is equipped with a strap and buckle connection 3' so that the said collar may be securely held upon the neck of the animal to which it is applied.

Mounted upon what may be termed the front face of the collar and completely inclosing such face, is a hame receiving plate 4 designed to receive the hames (not shown) and prevent wear of the outer tube incident to the application of the hames thereto. This plate, as illustrated, is composed of two companion sections 5, 5 which embrace the outer face of the collar transversely of its length, and each of these plates is formed with a longitudinal groove 6 alining with the groove in its companion plate to receive the hames and properly position the same upon the collar, the sections being riveted as at 5' or otherwise suitably fastened to the outer tube. To permit relative movement of the plates in the application and removal of the collar to and from the neck of an animal and to bring about a clamping action of the collar upon the neck of the animal, the plates have their lower ends interconnected through the medium of a resilient connection 7 which in the present instance comprises a pair of spring straps 8 riveted or otherwise fastened to the opposite sides of the sections 5 of the hame receiving plate. Integral with each of the sections 5 of the hame receiving plate and projecting rearwardly thereof and in engagement with the outer tube 2 is a wear resisting plate 9 adapted to be engaged by the tugs of the traces when the latter are connected to the hames so as to prevent mutilation of the collar owing to the pulling of the draft animal.

From the above description taken in connection with the accompanying drawing it will be seen that I have provided a horse collar in which the pressure of the draft animal is practically distributed in such a manner as to prevent the possibility of galling, chafing or bruising the shoulder of the draft animal, and wherein the collar proper is fully and adequately protected, against mutilation and wear, owing to the hame receiving and wear plates with which the collar is equipped.

Having thus described my invention, what I claim and desire to secure by Letters-Patent is:

1. A pneumatic horse collar having an open portion, a hame receiving plate secured to said collar, said plate comprising two sections, and a resilient connection between said sections and located at a point opposite the open portion of the collar to hold the collar closed.

2. In a pneumatic horse collar, an inner tube and an outer tube, a hame receiving plate secured to the outer surface of said outer tube, said plate including two sections, a resilient connection between said sections, and a wear plate on each of said sections and adapted to prevent mutilation of the collar in the pulling of the draft animal.

3. In a pneumatic horse collar, an inner tube and an outer tube, a hame receiving plate secured to said outer tube, said plate including companion sections formed with longitudinally alined grooves adapted to receive hames, a resilient connection between said sections, and a wear plate on each of said sections and adapted to prevent mutilation of the collar in the pulling of the draft animal.

In testimony whereof I affix my signature in presence of two witnesses.

HENRY HILL.

Witnesses:
E. C. HACKBARTH,
E. B. O'NEILL.

Copies of this patent may be obtained for five cents each, by addressing the "Commissioner of Patents, Washington, D. C."